Sept. 16, 1952     O. J. THOMAS     2,610,429
FISH BAIT
Filed Oct. 18, 1946
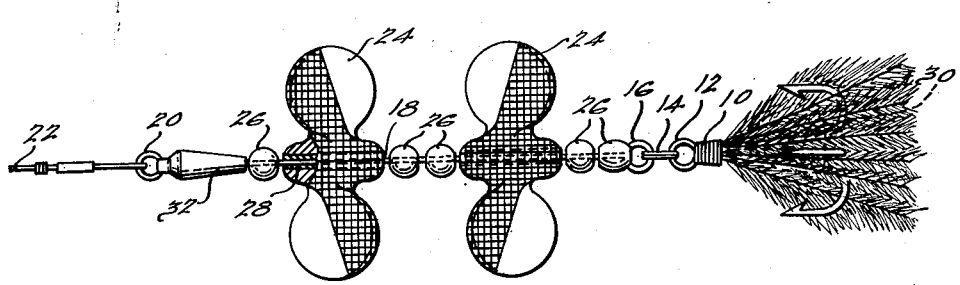
FIG. 1.
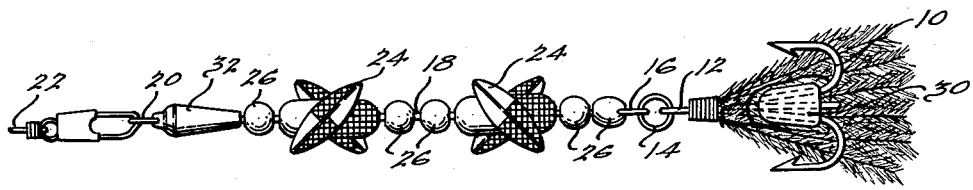
FIG. 2.
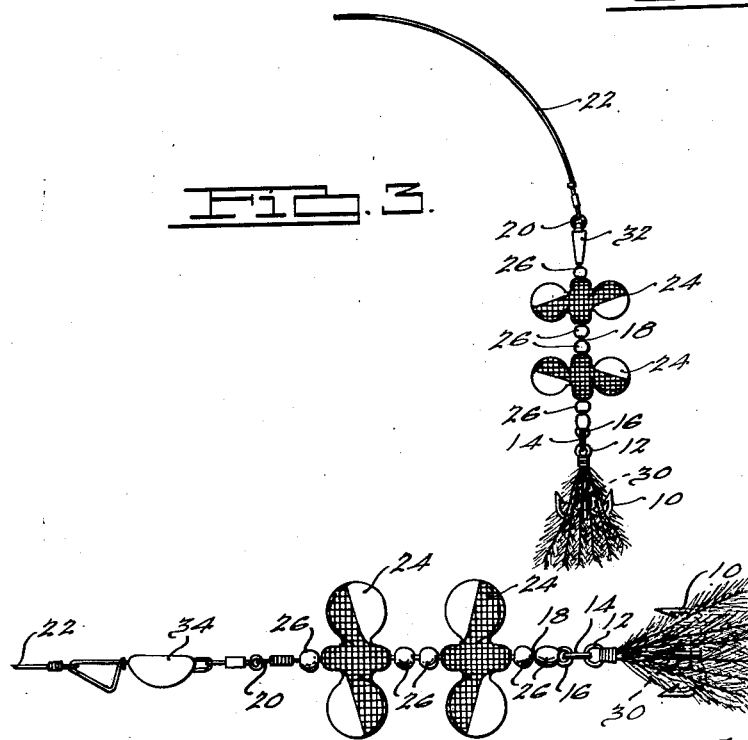
FIG. 3.
FIG. 4.
INVENTOR.
Orel J. Thomas.
BY
Harness, Dickey & Pierce.
ATTORNEYS.

Patented Sept. 16, 1952

2,610,429

UNITED STATES PATENT OFFICE 2,610,429

FISH BAIT

Orel J. Thomas, Tecumseh, Ontario, Canada

Application October 18, 1946, Serial No. 704,162

1 Claim. (Cl. 43—42.17)

This invention relates broadly to new and useful improvements in fish lures of the spinner type.

An important object of the present invention is to provide a fish lure of the above-mentioned character that will sink vertically in the water with the hook at the bottom and in such manner that the spinners rotate to attract fish as the lure settles.

Another object of the invention is to provide a fish lure of the above-mentioned character in which the spinners are made of plastic and rotate in opposite directions.

Still another object of the invention is to provide a fishing lure of the above-mentioned character that is simple in construction and relatively inexpensive to manufacture.

Other objects and advantages of the invention will be apparent during the course of the following description.

In the drawings forming a part of this specification and wherein like numerals are employed to designate like parts throughout the same, Fig. 1 is a top plan view of a lure embodying the invention, parts thereof being broken away and shown in section for clearness of illustration;

Fig. 2 is a side elevational view of the same;

Fig. 3 is a view showing the lure attached to a fishing line and illustrating the manner in which it settles in the water; and Fig. 4 is a top plan view of a modified lure embodying the invention.

In the drawing, wherein for the purpose of illustration are shown preferred embodiments of the invention, the numeral 10 designates a hook having the usual eye 12, which eye is coupled by a ring 14 to an eye 16 at one end of an elongated shank 18. The latter conveniently can be made from steel wire or the like and the opposite end thereof is formed with an eye 20 which is adapted for attachment to a leader or fishing line 22.

Counterrotating spinners 24 are mounted on the shank 18 and separated from each other and from the eyes 16 and 20 by bead-shaped spacers 26. The spinners 24 are identically formed but are mounted reversely on the shank 18 so that they rotate in opposite directions. As will be readily apparent to those skilled in the art, rotation of the spinners 24 in opposite directions prevents the lure from rotating and twisting the fishing line 22. These spinners 24 rotate as the lure travels through the water and, by such rotation, attract fish to bait on the hook 10. In order to enhance the attractiveness of the spinners for this purpose, they preferably are multi-colored as shown in the drawings. Although the spinners 24 may be of any desired or conventional construction, they preferably are made of plastic. Spinners of this type are relatively easy and inexpensive to manufacture; however, they are relatively soft and must be provided with metal bushings 28 as shown in Fig. 1, to serve as bearings for the spinners.

A weight 30 is fastened to the hook 10 and this weight is relatively heavy so that when the lure is not being actively pulled through the water it will sink endwise in the water with the hook at the bottom as shown in Fig. 3. Thus, when the lure is cast and hits the water, it may first be allowed to sink in the water before being retrieved. Under such conditions the weighted hook will cause it to sink hook end first and at a sufficient speed to cause the spinners to rotate so as to attract fish as the lure sinks.

Heretofore, lures of this type have been constructed in such manner that they sink in various positions, depending on how they land in the water, but never endwise as in the case of the present lure, or at least at a sufficient speed to cause effective rotation of the spinners under such conditions. Moreover, the prior constructions have been such that the spinners 24 necessarily rotate effectively only when the lure is pulled horizontally through the water. Since the spinners of prior lures of this type do not rotate when the lure is merely settling in the water, they fail to perform their intended functions under these conditions. Any possibility of a fish striking while the lure is merely settling with the spinners idle is quite remote.

The instant construction greatly improves the operation and utility of the prior art lures. When the lure is constructed according to the present invention, the spinners 24 not only rotate when the lure is pulled horizontally through the water but also when it is merely settling therein. As a result, there is a much greater possibility of a fish striking at the bait under the latter condition. In this connection it should be noted that the weight 30 must be attached directly to the hook 10, as it does not function in the same manner or serve the same purpose if located elsewhere on the lure.

If the spinners 24 are formed of nonmetallic or relatively light weight materials, it is desirable to provide a weight at the front or upper end of the lure in order to keep it under water during trolling or casting. Also, a weight thus positioned causes the lure to handle better during the cast.

In Figs. 1, 2, and 3, a relatively small weight 32 is shown on the shank 18 between eye 20 and the adjacent spacer 26, and in this form of the invention the weight is a permanent adjunct of the lure. Of course, weight 32 should be lighter than the weight 30 so that the latter controls the lure when it is settling in the water.

Of course, certain fish are most attracted to a lure when it travels near or on the surface of the water, and under these conditions the weight 32 can be omitted.

In order to provide a lure that is adaptable for either mode of use, to separate weight or sinker 34 may be used, as shown in Fig. 4, instead of the permanent or integral weight 32. In this form of the invention the weight 34 is introduced between the shank 18 and leader 22, one end thereof being attached to the eye 20 and the other end thereof being attached to the leader. When it is desired to keep the lure below the surface of the water, the sinker 34 is inserted between the lure and the fishing line; however, when it is desired for the lure to travel on or near the surface of the water, the weight 34 is removed and the leader or fishing line 22 is attached directly to the lure.

It is to be understood that the forms of the invention herewith shown and described are to be taken as preferred examples of the same and that various changes in the size, shape and arrangement of parts may be resorted to without departing from the spirit of the invention or the scope of the appended claim.

Having thus described the invention, I claim:

A fishing lure comprising, in combination, a hook, an elongated shank connected to said hook, lightweight plastic spinners mounted to rotate in opposite directions on the shank, at least one lightweight plastic bead loosely mounted on the shank at opposite sides of each spinner, said beads being separate from the spinners and both the beads and the spinners having confronting spherically curved portions which co-operate to permit easy rotation of the spinners, and a pair of separate individual weights one on the hook and the other on the end of said shank remote from the hook, one weight being relatively light and the other weight being relatively heavy, said relatively heavy weight being located adjacent the hook and said relatively light weight being located at the end of the shank remote from the hook, said relatively heavy weight controlling the action of the lure when the latter settles in the water causing it to descend vertically with the hook at the bottom and said relatively light weight controlling the action of the lure when trolling causing it to track properly in the water and preventing it from bobbing to the surface.

OREL J. THOMAS.

REFERENCES CITED

The following references are of record in the file of this patent:

UNITED STATES PATENTS

| Number | Name | Date |
|---|---|---|
| 817,257 | Lee | Apr. 10, 1906 |
| 830,404 | Barnes | Sept. 4, 1906 |
| 1,395,533 | Tuttle | Nov. 1, 1921 |
| 1,620,972 | Hobbs | Mar. 15, 1927 |
| 1,812,782 | Gluck | June 30, 1931 |
| 1,820,887 | Pflueger | Aug. 25, 1931 |
| 1,897,529 | Palmer et al. | Feb. 14, 1933 |

FOREIGN PATENTS

| Number | Country | Date |
|---|---|---|
| 10,702 | Great Britain | Dec. 11, 1913 |